US009093918B2

United States Patent
Yang et al.

(10) Patent No.: US 9,093,918 B2
(45) Date of Patent: Jul. 28, 2015

(54) CONTROL CIRCUIT FOR OFFLINE POWER CONVERTER WITHOUT INPUT CAPACITOR

(75) Inventors: Ta-Yung Yang, Milpitas, CA (US); Chih-Hsien Hsieh, Dacun Township, Changhua County (TW); Jung-Sheng Chen, Kaohsiung (TW)

(73) Assignee: SYSTEM GENERAL CORPORATION, New Taipei (TW)

( * ) Notice: Subject to any disclaimer, the term of this patent is extended or adjusted under 35 U.S.C. 154(b) by 401 days.

(21) Appl. No.: 13/604,339

(22) Filed: Sep. 5, 2012

(65) Prior Publication Data

US 2013/0094253 A1    Apr. 18, 2013

Related U.S. Application Data

(60) Provisional application No. 61/547,989, filed on Oct. 17, 2011.

(51) Int. Cl.
*H02M 1/42* (2007.01)
*H02M 3/335* (2006.01)

(52) U.S. Cl.
CPC ........ *H02M 1/4258* (2013.01); *H02M 3/33507* (2013.01); *Y02B 70/126* (2013.01)

(58) Field of Classification Search
CPC .............. H02M 1/4258; H02M 3/335; H02M 3/33507; H02M 3/33523; H02M 3/33546; H02M 3/33553; Y02B 70/126
USPC ......... 363/21.01–21.18, 39–41; 323/282–285
See application file for complete search history.

(56) References Cited

U.S. PATENT DOCUMENTS

| | | | | |
|---|---|---|---|---|
| 6,304,462 | B1 * | 10/2001 | Balakrishnan et al. | .... 363/21.01 |
| 7,215,107 | B2 * | 5/2007 | Djenguerian et al. | ........ 323/284 |
| 7,894,223 | B2 * | 2/2011 | Sato et al. | ........................ 363/97 |
| 2009/0021962 | A1 * | 1/2009 | Miftakhutdinov et al. | ..... 363/17 |
| 2010/0097104 | A1 | 4/2010 | Yang et al. | |
| 2012/0008352 | A1 * | 1/2012 | Huang et al. | .................... 363/95 |

FOREIGN PATENT DOCUMENTS

| | | |
|---|---|---|
| CN | 1964168 | 5/2007 |
| CN | 200956550 | 10/2007 |

OTHER PUBLICATIONS

Chinese language office action dated Apr. 28, 2014.
English language translation of abstract of CN 1964168 (published May 16, 2007).
English language translation of abstract of CN 200956550 (published Oct. 3, 2010).

\* cited by examiner

*Primary Examiner* — Jessica Han
(74) *Attorney, Agent, or Firm* — McClure, Qualey & Rodack, LLP

(57) ABSTRACT

The present invention provides a control circuit for a power converter. The control circuit includes a switching circuit, an input-voltage detection circuit and a current-limit threshold. The switching circuit generates a switching signal coupled to switch a transformer of the power converter for regulating an output of the power converter in response to a feedback signal. The input-voltage detection circuit generates a control signal when an input voltage of the power converter is lower than a low-input threshold. The feedback signal is generated in response to the output of the power converter. A maximum duty of the switching signal is increased in response to the control signal. The current-limit threshold is for limiting a maximum value of a switching current flowing through the transformer. The current-limit threshold is increased in response to the control signal. An input of the power converter doesn't connect with electrolytic bulk capacitors.

10 Claims, 3 Drawing Sheets

CONTROL CIRCUIT FOR OFFLINE POWER CONVERTER WITHOUT INPUT CAPACITOR

CROSS REFERENCE TO RELATED APPLICATIONS

This application claims the benefit of U.S. Provisional Application No. 61/547,989, filed on Oct. 17, 2011, the contents of which are incorporated herein by reference.

BACKGROUND OF THE INVENTION

1. Field of the Invention

The present invention relates to an offline power converter, more specifically, the present invention relates to a control circuit of the offline power converter.

2. Description of the Related Art

In conventional offline power converters, a bridge rectifier is utilized to rectify an AC (alternating current) input voltage into a pulsating DC (direct current) input voltage. An input capacitor, such as an electrolytic bulk capacitor, is usually applied at an output of the bridge rectifier to filter the pulsating DC input voltage as a smoother input voltage with small ripple. This bulk capacitor is utilized to store the energy and provide a minimum input voltage to guarantee a proper operation of the offline power converter. However, without the filtering operation of the bulk capacitor, the pulsating direct current input voltage will result in higher output line ripple and none-linearly power converting operation compared to the convention arts. Furthermore, the bulk capacitor generally occupies significant space of the power converter. Whenever the bulk capacitor can be eliminated, the advantages to the power converter will be longer life, smaller size, and greatly reduced manufacturing cost. Therefore, a control circuit capable of regulating an output of the power converter without the need of the bulk capacitor connected to its input is desired by the industries.

BRIEF SUMMARY OF THE INVENTION

The present invention provides a control circuit for a power converter. The control circuit of a power converter comprises a switching circuit, an input-voltage detection circuit and a current-limit threshold. The switching circuit generates a switching signal coupled to switch a transformer of the power converter for regulating an output of the power converter in response to a feedback signal. The input-voltage detection circuit generates a control signal when an input voltage of the power converter is lower than a low-input threshold. The feedback signal is generated in response to the output of the power converter. A maximum duty of the switching signal is increased in response to the control signal. A maximum value of a switching current flowing through the transformer is limited by a current-limit threshold. The current-limit threshold is increased in response to the control signal. An input of the power converter doesn't connect with electrolytic bulk capacitors. The input-voltage detection circuit detects a DC input voltage of the power converter via the transformer. The input voltage of the power converter is correlated to the DC input voltage of the power converter.

The present invention also provides a controller for a power converter. The controller comprises a switching circuit, an input-voltage detection circuit, a threshold-generation circuit and a maximum-duty circuit. The switching circuit generates a switching signal coupled to switch a transformer of the power converter for regulating an output of the power converter in response to a feedback signal. The input-voltage detection circuit generates a control signal when an input voltage of the power converter is lower than a low-input threshold. The threshold-generation circuit generates a current-limit threshold for limiting a maximum value of a switching current flowing through the transformer. The feedback signal is generated in response to the output of the power converter. The current-limit threshold is increased in response to the control signal. The maximum-duty circuit generates a maximum-duty signal for limiting a maximum duty of the switching signal. The maximum duty of the switching signal is increased in response to the control signal. An input of the power converter doesn't connect with electrolytic bulk capacitors. The input-voltage detection circuit detects a DC input voltage of the power converter via the transformer. The input voltage of the power converter is correlated to the DC input voltage of the power converter.

The present invention also provides a control circuit for an offline converter. The control circuit comprises a switching circuit, an input-voltage detection circuit, a threshold-generation circuit and a maximum-duty circuit. The switching circuit generates a switching signal coupled to switch a transformer of the offline power converter for regulating an output of the offline power converter in response to a feedback signal. The input-voltage detection circuit generates a control signal when an input voltage of the power converter is lower than an input-voltage threshold. The threshold-generation circuit generates a current-limit threshold for limiting a maximum value of a switching current flowing through the transformer. The maximum-duty circuit generates a maximum-duty signal for limiting a maximum duty of the switching signal. The feedback signal is generated in response to the output of the offline power converter. The current-limit threshold is increased in response to the control signal. The maximum duty of the switching signal is increased in response to the control signal. The input of the power converter doesn't connect with electrolytic bulk capacitors. The input-voltage detection circuit detects the input voltage of the offline power converter via the transformer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
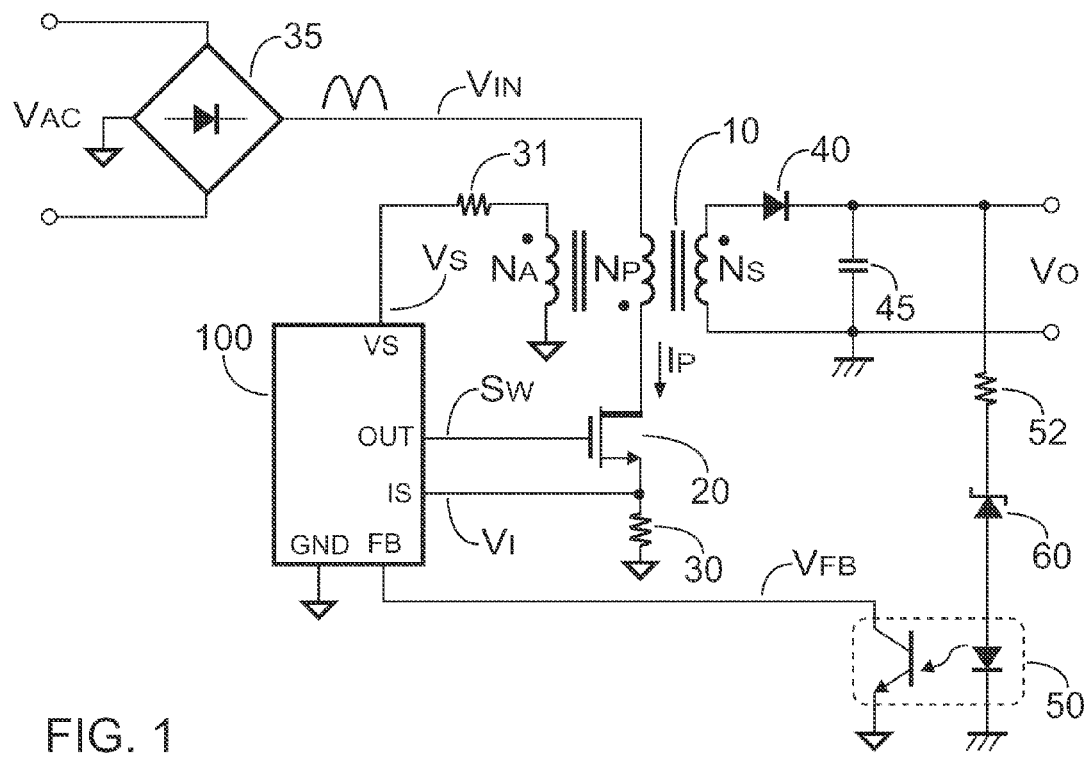
FIG. 1 shows a secondary-side controlled power converter without an input bulk capacitor connected to its input.

FIG. 1 shows an offline power converter without a bulk capacitor, such as an electrolytic capacitor, connected to its input. The power converter comprises a bridge rectifier 35, a transformer 10 having a primary winding NP, a secondary winding NS and an auxiliary winding NA, a power switch 20, a sensing resistor 30, a control circuit 100, a detection resistor 31, a rectifier 40, an output capacitor 45 and a feedback circuit. The feedback circuit comprises a resistor 52, a voltage regulator (zener diode) 60 and an opto-coupler 50. The bridge rectifier 35 converts an AC input voltage VAC to a DC input voltage VIN. The control circuit 100 generates a switching signal SW coupled to switch the transformer 10 via the power switch 20. A switching current IP flowing through the transformer 10 generates a current-sense signal VI across a current-sense device, such as the sensing resistor 30. The detection resistor 31 is connected to the auxiliary winding NA of the transformer 10 for obtaining a detection signal VS. The detection signal VS is supplied to a detection terminal VS of the control circuit 100. The switching signal SW is generated in response to a feedback signal VFB for regulating an output of the power converter. The feedback signal VFB is obtained from an output of the power converter via the resistor 52, the voltage regulator 60 and the opto-coupler 50. The rectifier 40 and the output capacitor 45 are coupled to the secondary winding NS of the transformer 10 for generating an output voltage VO at the output of the power converter.

An output power $P_O$ of the power converter can be expressed as, $$P = \frac{1}{2} \times L_P \times I_P^2 \times F_W \quad (1)$$

$$I_P = \frac{V_{IN} \times T_{ON}}{L_P}$$

$$P_O = V_O \times I_O = \frac{V_{IN}^2 \times T_{ON}^2}{2 \times L_P \times T}$$

$$P_O = V_O \times I_O = \frac{V_{IN}^2 \times T_{ON}^2}{2 \times L_P \times T} + \left[V_{IN} \times I_A \times \left(\frac{T_{ON}}{T}\right)\right] \quad (2)$$

where $V_{IN}$ represents the level of the DC input voltage $V_{IN}$; $T_{ON}$ represents an on-time of the switching signal $S_W$; $L_P$ represents an inductance of the primary winding $N_P$ of the transformer 10; T represents a switching period of the switching signal $S_W$; $F_W$ represents the switching frequency of the switching signal $S_W$; and $I_A$ represents a continuous current (energy) existed in the transformer 10 when the next switching cycle is started.

Equation (1) shows an output power $P_O$ of the power converter operated in discontinuous-current mode (DCM) and/or boundary-current mode (BCM). Equation (2) shows an output power $P_O$ of the power converter operated in continuous-current mode (CCM).

For the most of the power converters, a maximum of the on-time $T_{ON}$ of the switching signal $S_W$ is limited to prevent the transformer 10 from saturation. Thus, the output power $P_O$ (the output voltage $V_O$) of the power converter will be lower once the DC input voltage $V_{IN}$ become low, which will result a higher output ripple (line ripple). The present invention provides a control circuit that can reduce the output ripple without saturating the transformer.

Figure 2:
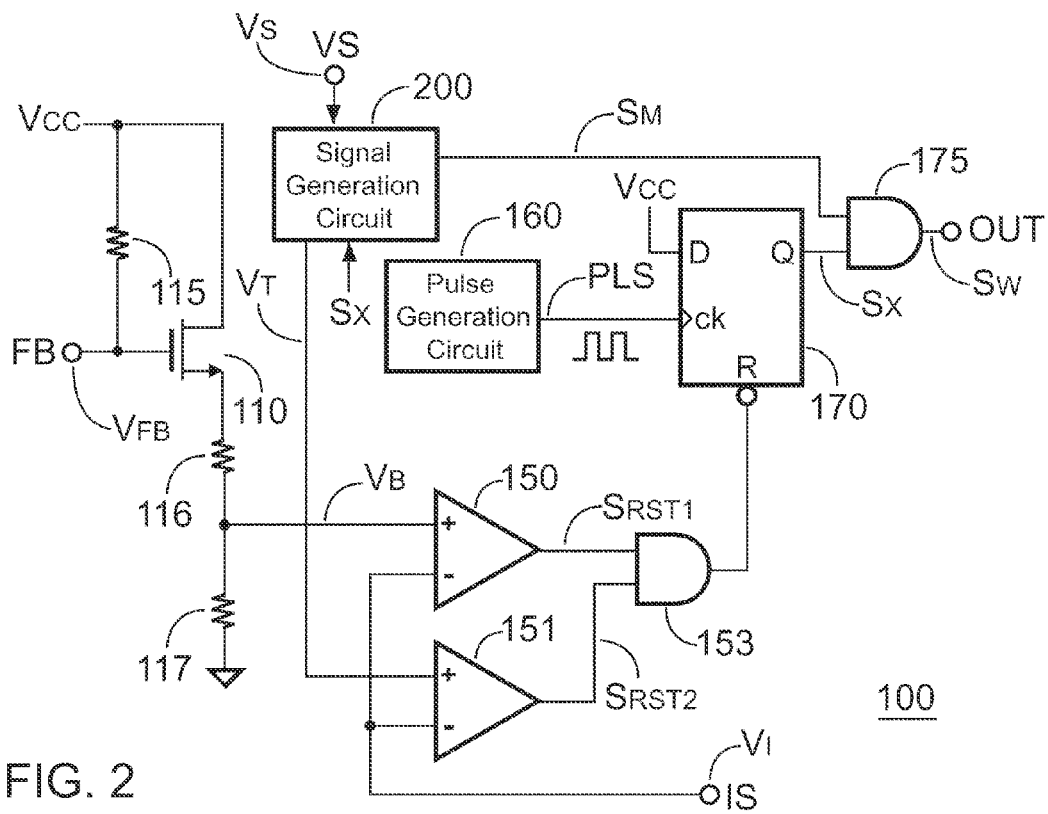
FIG. 2 shows an exemplary embodiment of a control circuit of the power converter in FIG. 1.

FIG. 2 shows an exemplary embodiment of the control circuit 100 according to present invention. The control circuit 100 comprises a level-shift circuit, a pulse generation circuit 160, a signal generation circuit (CKT) 200 and a switching circuit. The level-shift circuit comprises a transistor 110 and resistors 115, 116 and 117. The switching circuit comprises comparators 150 and 151, AND gates 153 and 175, and a flip-flop 170. The feedback signal VFB is supplied to a gate of the transistor 110. A first terminal of the resistor 115 and a drain of the transistor 110 are supplied with a supply voltage VCC of the control circuit 100. The resistors 116 and 117 are connected in series between a source of the transistor 110 and a ground reference. A feedback voltage VB is generated at a joint of the resistors 116 and 117 in response to the feedback signal VFB at the gate of the transistor 110. The feedback voltage VB is supplied to a positive terminal of the comparator 150. The current-sense signal VI is supplied to negative terminals of the comparators 150 and 151. The signal generation circuit 200 generates an over-current threshold VT in response to the detection signal VS. The over-current threshold VT is a current-limit threshold for limiting a maximum value of the switching current IP flowing through the transformer 10. The over-current threshold VT is supplied to a positive terminal of the comparator 151. The comparator 150 compares the feedback voltage VB and the current-sense signal VI to generate a first reset signal SRST1. The comparator 151 compares the over-current threshold VT and the current-sense signal VI to generate a second reset signal SRST2. The first reset signal SRST1 and the second reset signal SRST2 are supplied to inputs of the AND gate 153. An output of the AND gate 153 is connected to a reset terminal of the flip-flop 170. Once the first reset signal SRST1 or the second reset signal SRST2 becomes logic-low, the flip-flop 170 will be reset. The pulse generation circuit 160 generates a pulse signal PLS to enable the flip-flop 170. The flip-flop 170 generates a driving signal SX. The signal generation circuit 200 generates a maximum-duty signal SM in response to the detection signal VS and the driving signal SX. The maximum-duty signal SM and the driving signal SX are supplied to inputs of the AND gate 175 to generate the switching signal SW. Whenever the current-sense signal VI is greater than the feedback voltage VB, the output of the AND gate 153 will reset the flip-flop 170 in response to the first reset signal SRST1 for disabling the driving signal SX. The flip-flop 170 is enabled by the pulse signal PLS for generating the driving signal SX and the switching signal SW. The driving signal SX and the switching signal SW can further be disabled once the current-sense signal VI is higher than the over-current threshold VT.

When the power converter is operated in BCM (Boundary Current Mode) and CCM (Continuous Current Mode), the output voltage $V_O$ can be expressed as, $$\varphi_{TON} = \varphi_{TOFF} \quad (3)$$

$$V_{IN} \times T_{ON} = V_O \times \frac{N_P}{N_S} \times (T - T_{ON})$$

$$V_O = V_{IN} \times \frac{N_S}{N_P} \times \left(\frac{T_{ON}}{T - T_{ON}}\right)$$

$$\frac{\partial V_O}{\partial T_{ON}} = V_{IN} \times \frac{N_S}{N_P} \times \left[\left(\frac{1}{T - T_{ON}}\right) + \frac{T_{ON}}{(T - T_{ON})^2}\right]$$

$$\frac{\partial V_O}{\partial T_{ON}} = V_{IN} \times \frac{N_S}{N_P} \times \left[\frac{T}{(T - T_{ON})^2}\right]$$

where $\phi_{TON}$ is the magnetic-flux charged into the transformer 10; $\phi_{TOFF}$ is the magnetic-flux discharged from the transformer 10.

Equations (1) and (2) show that the output power $P_O$ of the power converter is dominated by the DC input voltage $V_{IN}$ and the on-time $T_{ON}$. A higher duty cycle ($T_{ON}/T$) can increase the output power $P_O$ in case the DC input voltage $V_{IN}$ is relatively lower. However, in term of loop stability, equation (3) shows that the higher duty cycle and/or a higher DC input voltage $V_{IN}$ will result in a high loop gain. This high loop gain may cause the stability problem to the feedback loop. Therefore, according to the present invention, the control circuit 100 will increase the maximum on-time $T_{ON}$ of the switching signal $S_W$ to reduce the output ripple only when the DC input voltage $V_{IN}$ is lower than a low-input threshold $V_{T1}$. Besides, the over-current threshold $V_T$ will increase to allow a higher switching current $I_P$ once the DC input voltage $V_{IN}$ is lower than the low-input threshold $V_{T1}$. The higher switching current $I_P$ can deliver higher output power $P_O$ to reduce the line ripple, particularly for the power converter operated in CCM.

Figure 3:
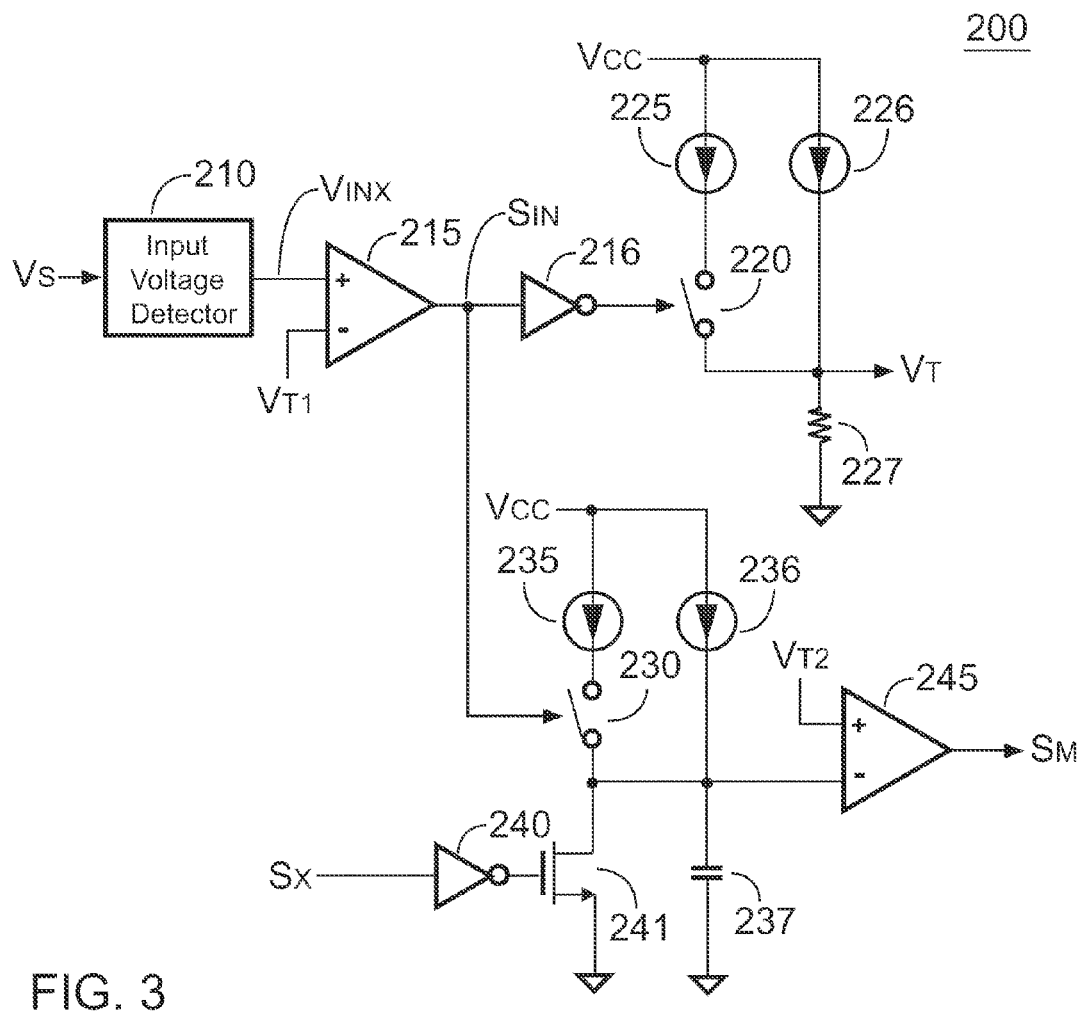
FIG. 3 shows an exemplary embodiment of a signal generation circuit of the controller in FIG. 2.

FIG. 3 shows an exemplary embodiment of the signal generation circuit 200 according to the present invention. The signal generation circuit 200 comprises an input voltage detector 210, a comparator 215, a threshold-generation circuit and a maximum-duty circuit. The threshold-generation circuit comprises an inverter 216, current sources 225 and 226, a switch 220 and a resistor 227. The maximum-duty circuit comprises an inverter 240, current sources 235 and 236, a switch 230, a transistor 241, a capacitor 237 and a comparator 245. The input voltage detector 210 and the comparator 215 form an input-voltage detection circuit. The input voltage detector 210 is coupled to detect the DC input voltage $V_{IN}$ by receiving the detection signal $V_S$ to generate an input voltage $V_{INX}$. The magnitude of the input voltage $V_{INX}$ is correlated to that of the input voltage $V_{IN}$. The detailed operation of the input voltage detector 210 can be found in the prior arts of "Detection Circuit for Sensing the Input Voltage of Transformer", U.S. Pat. No. 7,671,578; and "Control Method and Circuit with Indirect Input Voltage Detection by Switching Current Slope Detection", U.S. Pat. No. 7,616,461 and will be omitted herein. The input voltage $V_{INX}$ is further coupled to the comparator 215 to be compared with the low-input thresholds $V_{T1}$ for generating a control signal $S_{IN}$. The control signal $S_{IN}$ will become logic-high whenever the input voltage $V_{INX}$ is greater than the low-input threshold $V_{T1}$ and vice versa. The control signal $S_{IN}$ controls the switch 220 via the inverter 216. The current source 225, the switch 220 and the resistor 227 are connected in series between the supply voltage $V_{CC}$ and the ground reference. The current source 226 is connected between the supply voltage $V_{CC}$ and a joint of the switch 220 and the resistor 227. The over-current threshold $V_T$ is generated at the joint of the switch 220 and the resistor 227. When the input voltage $V_{INX}$ is higher than the low-input threshold $V_{T1}$, the control signal $S_{IN}$ will become logic-high, and a first magnitude of the over-current threshold $V_T$ is determined by the current source 226 and the resistor 227. When the input voltage $V_{INX}$ is lower than the low-input threshold $V_{T1}$, the control signal $S_{IN}$ will become logic-low, and a second magnitude of the over-current threshold $V_T$ is determined by the current sources 225 and 226 and the resistor 227. The second magnitude of the over-current threshold $V_T$ is greater than the first magnitude of the over-current threshold $V_T$. That is, a higher over-current threshold $V_T$ can be obtained when the input voltage $V_{INX}$ is lower than the low-input threshold $V_{T1}$.

The current source 235, the switch 230 and the transistor 241 are connected in series between the supply voltage $V_{CC}$ and the ground reference. The current source 236 is connected between the supply voltage $V_{CC}$ and a joint of the switch 230 and the transistor 241. The capacitor 237 is connected between the joint of the switch 230 and the transistor 241 and the ground reference. The driving signal $S_X$ controls the transistor 241 via the inverter 240. As the control signal $S_{IN}$ is disabled (logic-low) and the driving signal $S_X$ is being enabled, the capacitor 237 is charged by the current source 236. As the control signal $S_{IN}$ is enabled (logic-high), the switch 230 will be turned on and the capacitor 237 will be charged by the current sources 235 and 236 simultaneously. As the driving signal $S_X$ is disabled, the capacitor 237 will be discharged immediately. A voltage across the capacitor 237 is supplied to a negative terminal of the comparator 245. A positive terminal of the comparator 245 is supplied with a threshold $V_{T2}$. The comparator 245 generates the maximum-duty signal $S_M$ by comparing the voltage across the capacitor 237 and the threshold $V_{T2}$. The control signal $S_{IN}$ is coupled to control the switch 230 for programming the maximum-duty signal $S_M$. A maximum duty of the switching signal $S_W$ is increased in response to the control signal $S_{IN}$. The maximum-duty signal $S_M$ is enabled whenever the driving signal $S_X$ is enabled. The capacitor 237 and the current sources 235 and 236 determine the pulse width of the maximum-duty signal $S_M$ when the input voltage $V_{INX}$ is higher than the low-input threshold $V_{T1}$. Once the input voltage $V_{INX}$ is lower than the low-input threshold $V_{T1}$, only the capacitor 237 and the current source 236 will determine the pulse width of the maximum-duty signal $S_M$. Therefore, the maximum-duty signal $S_M$ and the switching signal $S_W$ with wider pulse width can be obtained when the input voltage $V_{INX}$ is lower than the low-input threshold $V_{T1}$.

Figure 4:
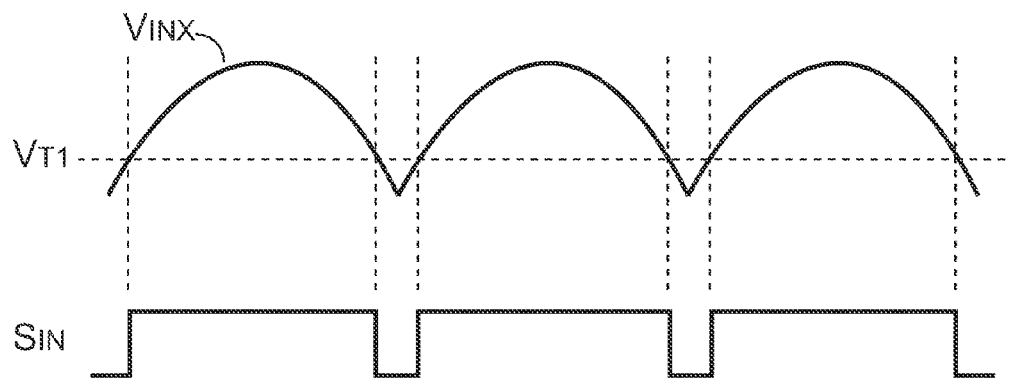
FIG. 4 shows a magnitude of a low-input threshold and the waveforms of an input signal and a control signal of the signal generation circuit in FIG. 3.

FIG. 4 shows a magnitude of the threshold $V_{T1}$ and the waveforms of the input voltage $V_{INX}$ and the control signal $S_{IN}$. The pulse width of the control signal $S_{IN}$ increases whenever the low-input threshold $V_{T2}$ decreases, and vice versa.

Figure 5:
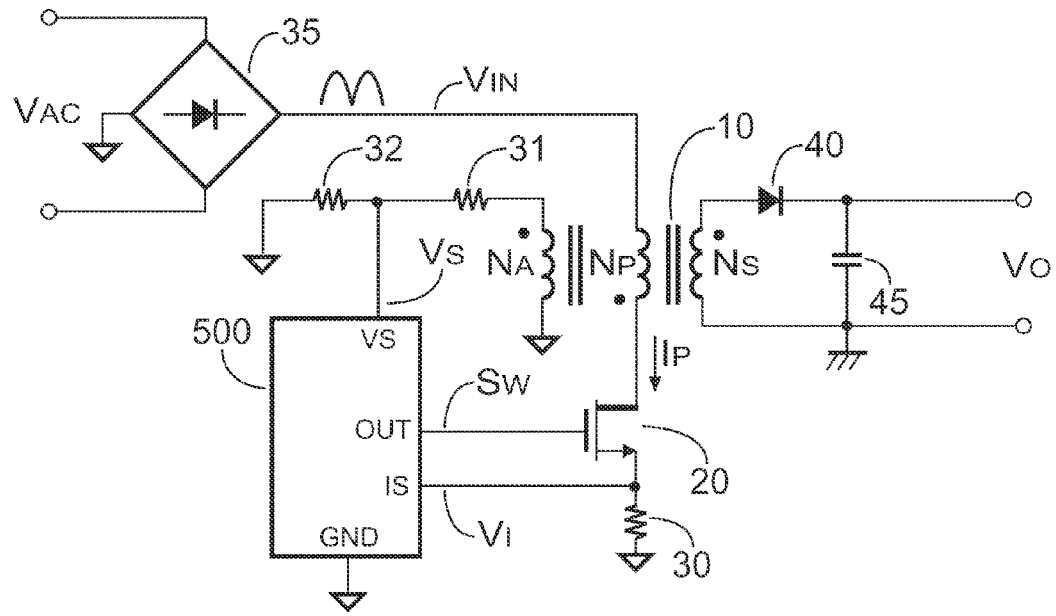
FIG. 5 shows a primary-side controlled power converter without an input bulk capacitor connected to its input.

FIG. 5 shows a primary-side controlled power converter without an input bulk capacitor connected to its input. Different to the embodiment in FIG. 1, the feedback signal representing the output voltage $V_O$ is obtained from a voltage divider connected to the auxiliary winding $N_A$ of the transformer 10. The voltage divider is formed by resistors 31 and 32. A control circuit 500 generates the switching signal $S_W$ in response to the detection signal $V_S$ from the auxiliary winding $N_A$ of the transformer 10.

Figure 6:
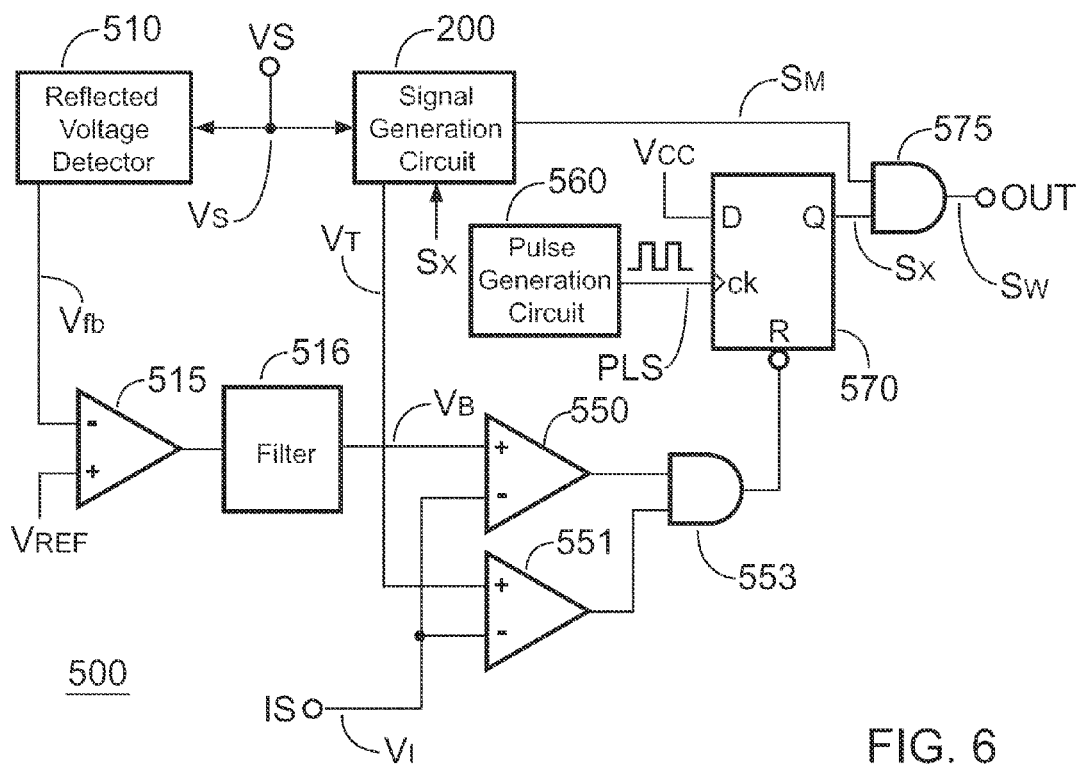
FIG. 6 shows an exemplary embodiment of a control circuit of the primary-side controlled power converter in FIG. 5.

FIG. 6 shows an exemplary embodiment of the control circuit 500 according to the present invention. The control circuit 500 comprises a reflected voltage detector 510, an error amplifier 515, a filter 516, a pulse generation circuit 560, a signal generation circuit 200 and a switching circuit. The switching circuit comprising comparators 550 and 551, AND gates 553 and 575, and a flip-flop 570 operates the same as the switching circuit in FIG. 2. The reflected voltage detector 510 generates a feedback signal $V_{fb}$ supplied to a negative terminal of the error amplifier 515 by sampling the detection signal $V_S$. The detailed operation of the primary-side controlled power converter can be found in the prior art of "Close-loop PWM controller for primary-side controlled power converters", U.S. Pat. No. 7,016,204.

A positive terminal of the error amplifier 515 receives a reference voltage $V_{REF}$. An output of the error amplifier 515 generates the feedback voltage $V_B$ via the filter 516. The feedback voltage $V_B$ is supplied to the comparator 550 to be compared with the current-sense signal $V_I$ to disable the driving signal $S_X$ via the AND gate 553 and the flip-flop 570. The driving signal $S_X$ generated by the flip-flop 570 is supplied to an input of the AND gate 575. Another input of the AND gate 575 is coupled to receive the maximum-duty signal $S_M$. An output of the AND gate 575 generates the switching signal $S_W$. The signal generation circuit 200 generates the maximum-duty signal $S_M$ in response to the detection signal $V_S$. The flip-flop 570 is enabled by the pulse signal PLS for generating the switching signal $S_W$ via the AND gate 575. The pulse signal PLS is generated by the pulse generation circuit 560. The signal generation circuit 200 generates the over-current threshold $V_T$. The driving signal $S_X$ and the switching signal $S_W$ can further be disabled once the current-sense signal $V_I$ is higher than the over-current threshold $V_T$. The over-current threshold $V_T$ is utilized for limiting the maximum value of the switching current $I_P$. The comparator 551 is coupled to receive the current-sense signal $V_I$ and the over-current threshold $V_T$ for disabling the flip-flop 570 via the AND gate 553.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control circuit of a power converter comprising:
   a switching circuit for generating a switching signal coupled to switch a transformer of said power converter for regulating an output of said power converter in response to a feedback signal; and
   an input-voltage detection circuit for generating a control signal when an input voltage of said power converter is lower than a low-input threshold,
   wherein said feedback signal is generated in response to said output of said power converter, and a maximum duty of said switching signal is increased in response to said control signal, and
   wherein an input of said power converter doesn't connect with electrolytic bulk capacitors.

2. The control circuit as claimed in claim 1, wherein a maximum value of a switching current flowing through said transformer is limited by a current-limit threshold, and said current-limit threshold is increased in response to said control signal.

3. The control circuit as claimed in claim 1, wherein said input-voltage detection circuit detects a DC input voltage of said power converter via said transformer, and said input voltage of said power converter is correlated to said DC input voltage of said power converter.

4. A controller of a power converter, comprising:
   a switching circuit for generating a switching signal coupled to switch a transformer of said power converter for regulating an output of said power converter in response to a feedback signal;
   an input-voltage detection circuit for generating a control signal when an input voltage of said power converter is lower than a low-input threshold; and
   a threshold-generation circuit for generating a current-limit threshold for limiting a maximum value of a switching current flowing through said transformer,
   wherein said feedback signal is generated in response to said output of said power converter, and said current-limit threshold is increased in response to said control signal.

5. The controller as claimed in claim 4 further comprising:
   a maximum-duty circuit for generating a maximum-duty signal for limiting a maximum duty of said switching signal,
   wherein said maximum duty of said switching signal is increased in response to said control signal.

6. The controller as claimed in claim 4, wherein an input of said power converter doesn't connect with electrolytic bulk capacitors.

7. The controller as claimed in claim 4, wherein said input-voltage detection circuit detects a DC input voltage of said power converter via said transformer, and said input voltage of said power converter is correlated to said DC input voltage of said power converter.

8. A control circuit of an offline power converter comprising:
   a switching circuit for generating a switching signal coupled to switch a transformer of said offline power converter for regulating an output of said offline power converter in response to a feedback signal;
   an input-voltage detection circuit for generating a control signal when an input voltage of said offline power converter is lower than an input-voltage threshold;
   a threshold-generation circuit for generating a current-limit threshold for limiting a maximum value of a switching current flowing through said transformer; and
   a maximum-duty circuit for generating a maximum-duty signal for limiting a maximum duty of said switching signal,
   wherein said feedback signal is generated in response to said output of said offline power converter, said current-limit threshold is increased in response to said control signal, and said maximum duty of said switching signal is increased in response to said control signal.

9. The control circuit as claimed in claim 8, wherein said input of said power converter doesn't connect with electrolytic bulk capacitors.

10. The control circuit as claimed in claim 8, wherein said input-voltage detection circuit detects said input voltage of said offline power converter via said transformer.

* * * * *